(12) United States Patent
Chiang

(10) Patent No.: US 8,243,149 B2
(45) Date of Patent: Aug. 14, 2012

(54) CAMERA MODULE WITH ANTI-SHAKE MECHANISM

(75) Inventor: Shun-Fan Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 342 days.

(21) Appl. No.: 12/718,089

(22) Filed: Mar. 5, 2010

(65) Prior Publication Data

US 2011/0019075 A1 Jan. 27, 2011

(30) Foreign Application Priority Data

Jul. 21, 2009 (CN) .......................... 2009 1 0304588

(51) Int. Cl.
*H04N 5/228* (2006.01)

(52) U.S. Cl. .................... 348/208.5; 348/208.7

(58) Field of Classification Search .................. None
See application file for complete search history.

(56) References Cited

U.S. PATENT DOCUMENTS

| 7,161,621 B2 * | 1/2007 | Kai et al. ................. 348/208.11 |
| 2010/0208089 A1 * | 8/2010 | Chang ........................ 348/208.5 |

* cited by examiner

*Primary Examiner* — Albert Cutler
(74) *Attorney, Agent, or Firm* — Altis Law Group, Inc.

(57) ABSTRACT

An exemplary camera module includes a fixture, a lens module, a movable frame, an image sensor, a position sensor, a first and a second magnet, and a first and a second magnetic field generator. The position sensor is used to detect displacements of the lens module caused by shake. The magnetic field generators are used to apply a magnetic field to the corresponding magnets, each of the magnetic field generators is electrifiable in response to detection by the position sensor of displacement of the lens module caused by shake. Accordingly, at least one of the magnets and the corresponding magnetic field generator cooperatively drive the lens module to move and compensate the displacement of the image sensor.

19 Claims, 7 Drawing Sheets

CAMERA MODULE WITH ANTI-SHAKE MECHANISM

BACKGROUND

1. Technical Field

The disclosure generally relates to camera modules, and particularly, to an anti-shake camera module.

2. Description of Related Art

Lens modules and image sensors are key components of camera modules. Generally, light beams from an object transmit through the lens module along a predetermined path and fall on a central region of the image sensor. When an image plane of the object is precisely on the image sensor, a clear image is obtained. However, camera shake occurring at the time of image capture causes either or both of the lens module and the image sensor to move slightly relative to the object. Due to resultant imprecision between image plane of the object and the image sensor, blurred image is obtained.

For such problems, anti-shake mechanisms utilizing motors were devised to move the image sensor to the image plane of the object when camera shake occurs. However, such motors are miniaturization and energy-inefficient vis-à-vis lens modules thus warranting an improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present camera module. Moreover, in the drawings, all the views are schematic, and like reference numerals designate corresponding parts throughout the several views.

DETAILED DESCRIPTION OF EMBODIMENTS

Embodiments of the camera module will now be described in detail below and with reference to the drawings.

Figure 1:
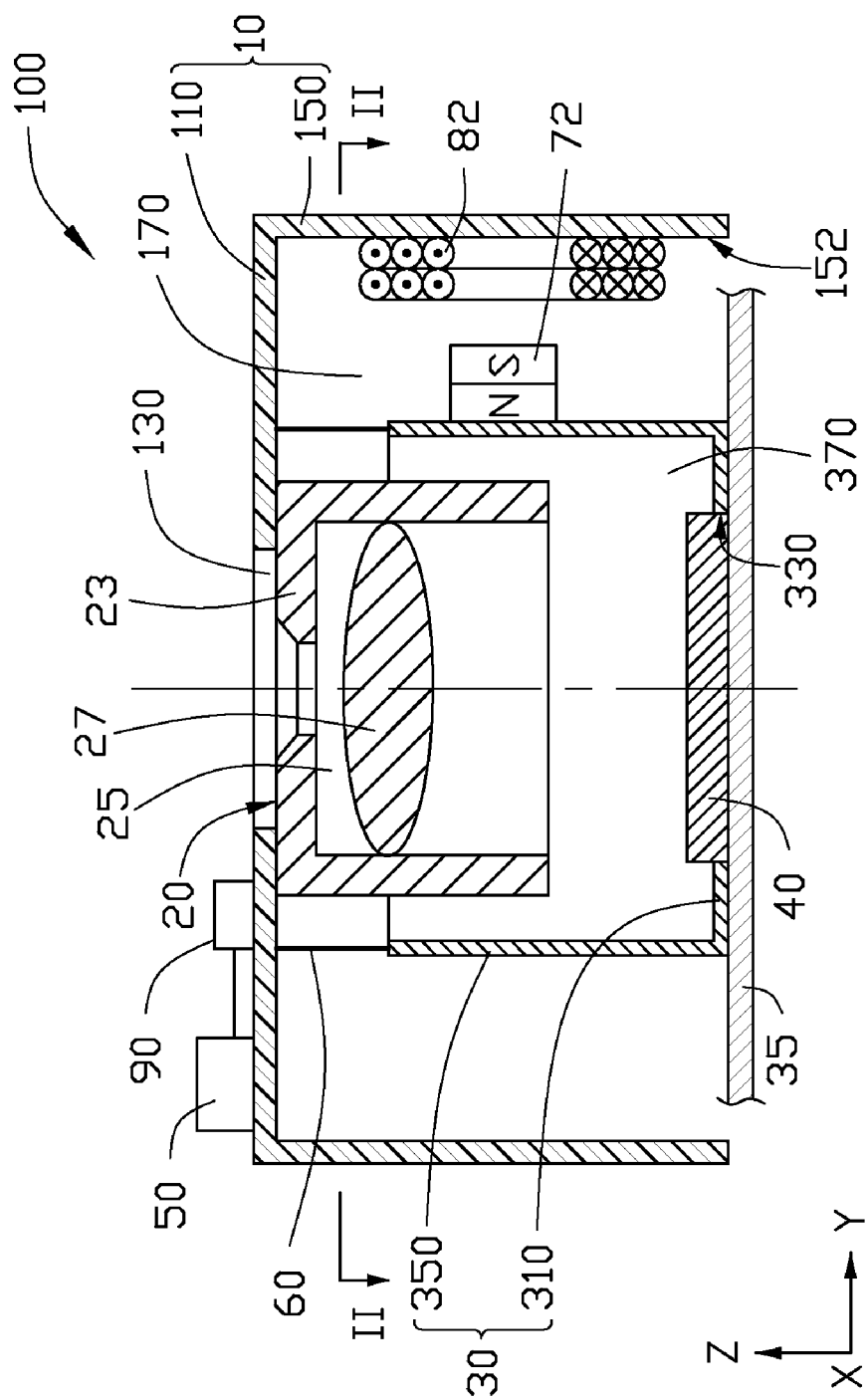
FIG. 1 a sectional view of a camera module, in accordance with an exemplary embodiment.

Referring to FIG. 1, an exemplary camera module 100 in accordance with an exemplary embodiment is shown. The camera module 100 includes a fixture 10, a lens module 20, a movable frame 30, an image sensor 40, a position sensor 50, a first magnet 72, a second magnet 74 (see FIG. 2), a first magnetic field generator 82, and a second magnetic field generator 84 (see FIG. 2).

The fixture 10 is configured to hold the lens module 20, the frame 30, the first magnetic field generators 82, and the second magnetic field generator 84. The fixture 10 includes a top board 110, a hole 130, and a pedestal 150. The hole 130 is defined in a central portion of the top board 110. The pedestal 150 extends downwardly from a peripheral portion of the top board 110. The top board 110 and the pedestal cooperate to define a first receiving space 170. A cross-section of the pedestal 150 is substantially rectangular, and the pedestal 150 includes four interior periphery sidewalls, for example, two parallel first periphery sidewalls 152 and two parallel second periphery sidewalls 154. Each of the first periphery sidewalls 152 is located between, and adjoins the two periphery sidewalls 154.

Figure 2:
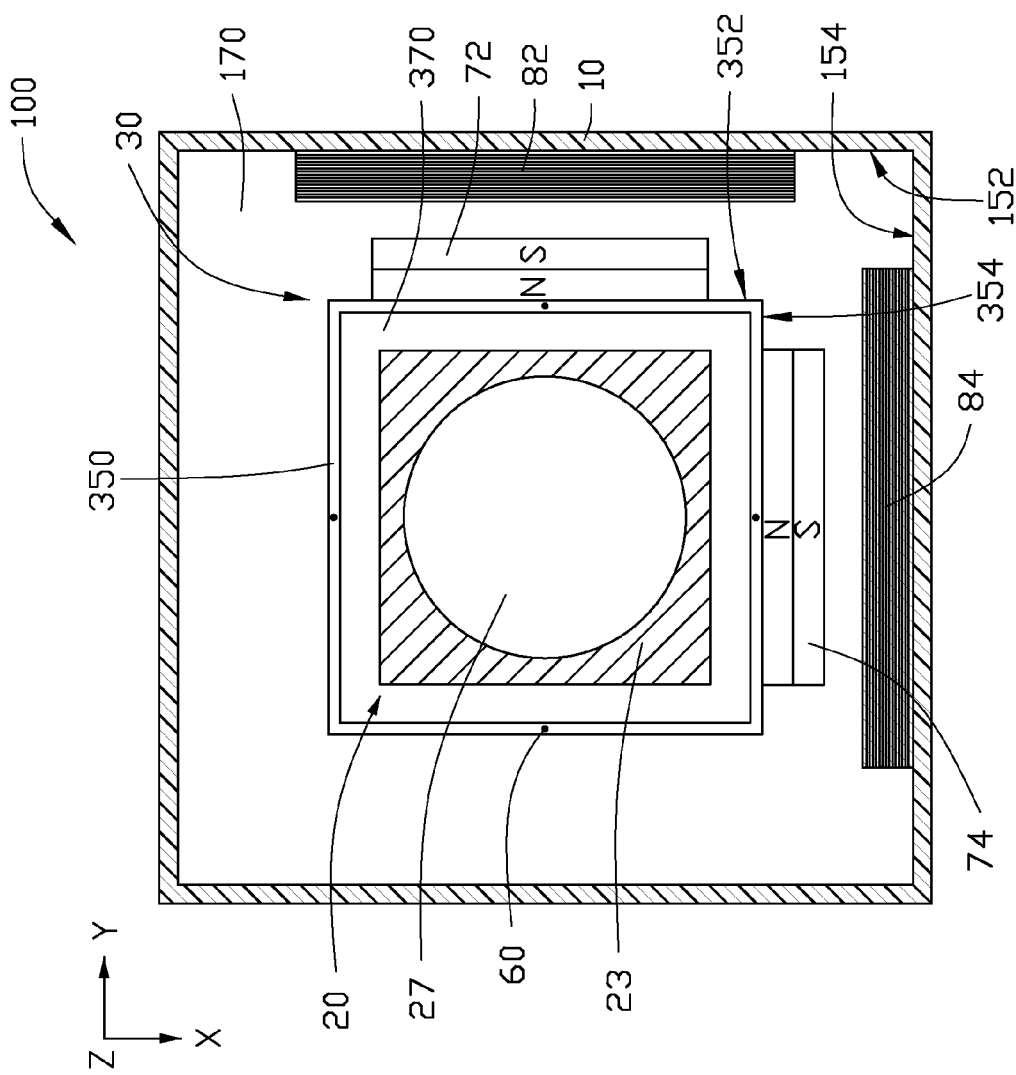
FIG. 2 is a cross sectional view of the camera module corresponding to FIG. 1, which is taken from line II-II.

Referring also to FIG. 2, the lens module 20 includes a barrel 23 having a through hole 25, and a lens 27 received in the through hole 25. The barrel 23 is attached to the top board 110 and secured in the first receiving space 170. An optical axis of the lens 27 is parallel to a Z-axis of a Cartesian coordinate system. In this embodiment, a cross-section of the barrel 23 is substantially rectangular, and the through hole 25 is substantially round. In alternative embodiments, the cross-section of the barrel 23 and the through hole 25 can be substantially round. The barrel 23 is attached to the top board 110, and the hole 130 in the top board 110 communicates with the through hole 25 of the barrel 23.

The frame 30 is spaced a distance from the top board 110 of the fixture 50 by four holding wires 60. The frame 30 includes a base board 310 and a holder 350. The holder 350 extends upwardly from a peripheral portion of the base board 310 toward the top board 110. The base board 310 and the holder 350 cooperate to define a second receiving space 370 for substantially receiving the image sensor 40. A cross-section of the holder 350 is substantially rectangular, and the holder 350 includes four exterior periphery sides, for example, two parallel first periphery sides 352 and two parallel second periphery sides 354. Each of the first periphery sides 352 is located between and adjoins the two second periphery sides 354. The holding wires 60 are fixed between the holder 350 and the top board 110 to hold the frame 30. In this embodiment, the number of the holding wires 60 is four. The four holding wires 60 are fixed to a distal end of the holder 350 and located adjacent to the first and second periphery sides 352, 354, respectively. The holding wires 60 can for example be made of metal. The flexibility of the holding wires 60 allows movement of the lens module 10 along an XY plane, which is perpendicular to the Z-axis.

The image sensor 40 can be a charge-coupled device (CCD) or a complementary metal oxide semiconductor device (CMOS), and is attached to the frame 30. In this embodiment, the camera module 100 further includes a circuit board 35 for mounting the image sensor 40 thereon. The circuit board 35 is attached to the base board 310 at a side thereof facing away from the holder 310. The base board 310 further has a hole 330 defined in the central region thereof to expose the circuit board 35. The image sensor 50 is secured on the circuit board 35 and extends through the hole 330 to the second receiving space 370, an essential part of the image sensor 40 is received in the second receiving space 370. In alternative embodiments, the image sensor 40 can be directly mounted on the base board 310 and received in the second receiving space 370 without the circuit board 35.

The position sensor 50 is mounted on the fixture 10, and is capable of detecting position of at least one of the lens module 20 and the image sensor 40. In particular, the position sensor 50 is mounted on the top board 110 of the fixture 10.

The first magnets 72 and the second magnets 74 are mounted on the frame 30. In this embodiment, the first and second magnets 72, 74 each can be a permanent magnet or an electromagnet, and are mounted to the two adjacent first and second periphery sides 352, 354 of the holder 350.

The first magnetic field generator 82 and the second magnetic field generator 84 are mounted on the fixture 10. In this embodiment, the first and second magnetic field generators 82, 84 are mounted on two first and second peripheral sidewalls 152, 154 of the pedestal 150. The first magnetic field generator 82 is located adjacent, for example, opposite the first magnet 72. The second magnetic field generator 84 is located adjacent, for example, opposite the second magnet 74.

The first and second magnetic field generators 82, 84 are configured to generate a magnetic field around the respective first and second magnet 72, 74. Preferably, the frame 30 may be made of metallic material for blocking the first and second magnets 72, 74, as well as the first and second magnetic field generators 82, 84 from causing electromagnetic interference to the image sensor 40. In addition, gaps (not labeled) are maintained between the first and second magnets 72, 74 and the respective first and second magnetic field generators 82, 84, for allowing the lens module 10 to be movable along the XY plane. In this embodiment, each of the first and second magnetic field generators 82, 84 can be an electromagnetic coil. In operation of the first and second magnetic field generators 82, 84, a current is applied to at least one of the first and second magnetic field generators 82, 84. Either or both of the first and second magnetic field generators 82, 84 thus generate(s) a magnetic field around the respective first or/and the second magnet 72, 74. As such, an electromagnetic force is generated between either or both of the first and second magnetic field generators 82, 84 and the respective first or/and the second magnet 72, 74. The first and second magnet 72, 74 are subject to electromagnetic force along four different directions in the XY-plane, depending on the direction of the current in either or both of the first and second magnetic field generators 82, 84. In particular, for the first magnet 72, the electromagnetic force may operate in positive or negative Y directions. For the second magnet 74, the electromagnetic force may operate in positive or negative X directions. In this way, the first and second magnets 72, 74 are capable of being selectively moved along the four axial directions in the XY plane, and the first and second magnets 72, 74 accordingly move the lens module 10 along selected of the four axial directions in the XY plane simultaneously. Furthermore, when the current is switched off, the lens module 10 can return to an original position due to the resilience of the holding wires 60.

The camera module 100 may further include a controller 90. The controller 90 is configured for applying current to the first and second magnetic field generators 82, 84, as well as controlling the magnitude, direction, and duration of the current based on the motions of the lens module 10 and the image sensor 40.

In use, when the camera module 100 is not performing anti-shake function(s), the holding wires 60 are parallel to each other, and parallel to an optical axis of the lens module 10. In contrast, during camera shake of camera module 100, the shaking may for example lead to motions of the camera module 100 along the X, Y, and Z axes.

Figure 3:
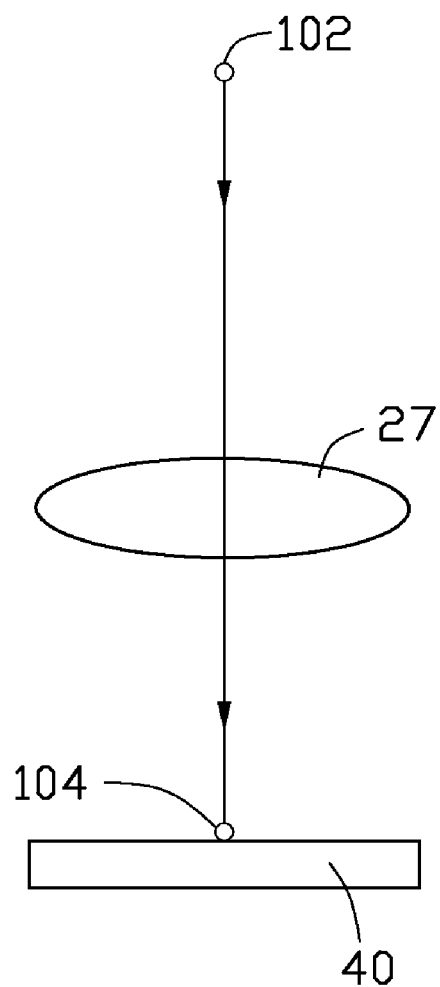
FIG. 3 is a side plan view showing a light path in a normal state of a lens and an image sensor of the camera module of FIG. 1 relative to an object.

Referring to FIG. 3, in one example, the camera module 100 operates in a normal image capturing state, an exemplary light beam from an object 102 transmits in an intended path through the lens 27 to arrive at a central region of the image sensor 40. The image sensor 40 senses the light beam, thus generates a clear image 104 of the object. In this state, the controller 90 does not need to apply current to the first or second magnetic field generators 82, 84.

Figure 4:
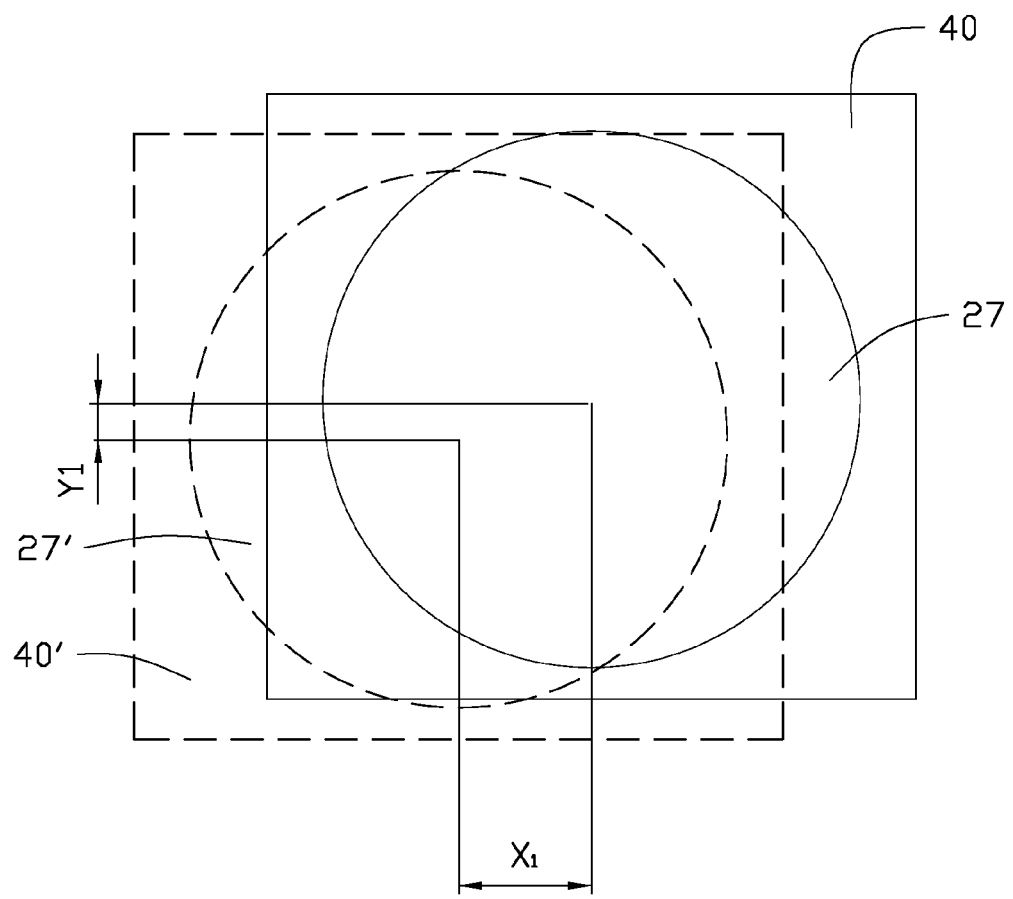
FIG. 4 is a top plan view illustrating displacement of the lens and the image sensor relative to the object due to shaking of the camera module.
Figure 5:
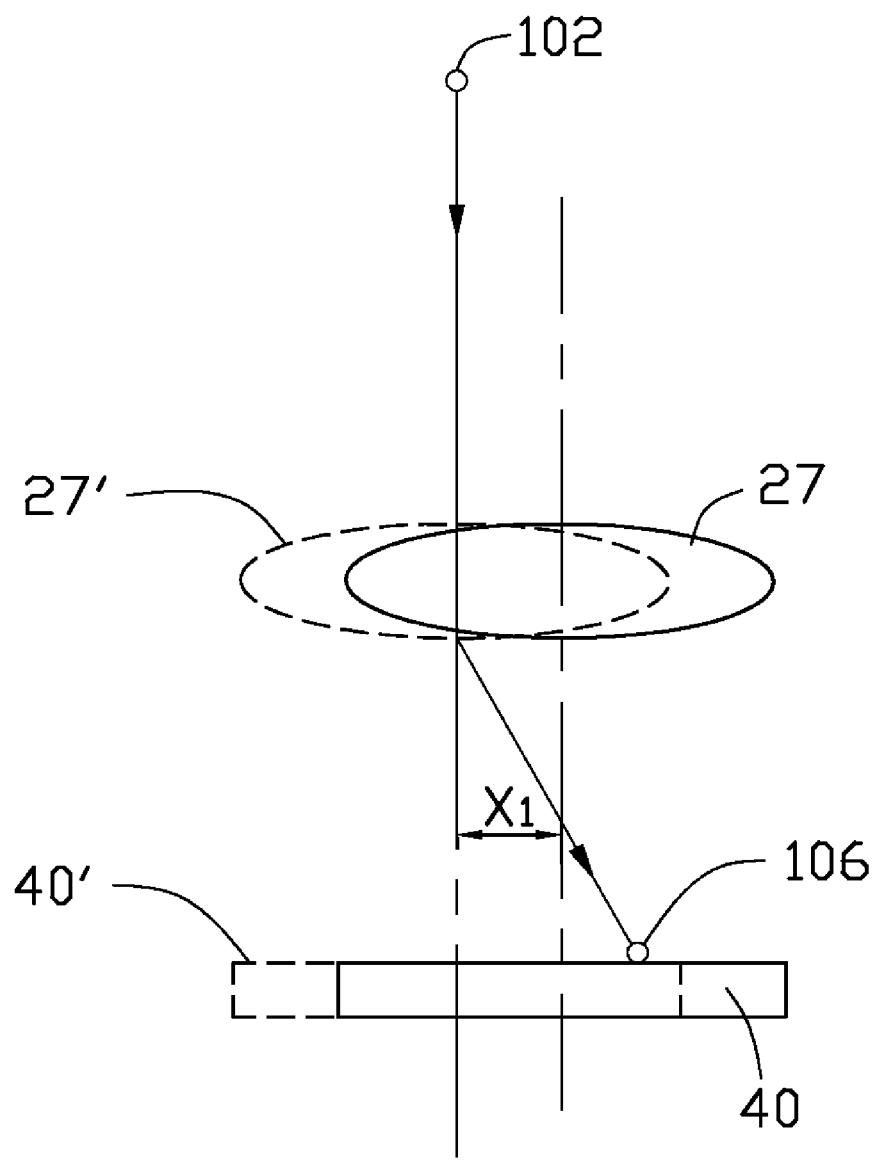
FIG. 5 is a side plan view corresponding to FIG. 4, which illustrates the light path of FIG. 2 deviated by the displacement of the lens and the image sensor relative to an object.

Referring to FIGS. 4 and 5, in another example, shaking of the camera module 100 occurs, the lens 27 and the image sensor 40 are displaced from their respective original positions 27', 40'. For example, each of the lens 27 and the image sensor 40 is displaced a distance X1 along the positive direction of the X-axis, and a distance Y1 along the negative direction of the Y-axis, as shown in FIG. 4. In this state, if no correction were made to the displacement of the lens 27 or the displacement of the image sensor 40, the exemplary light beam from an object 102 would fall on a region of the image sensor 40 deviated from the central region, and generate a blurred image 106 on the image sensor 40, as shown in FIG. 5.

Figure 6:
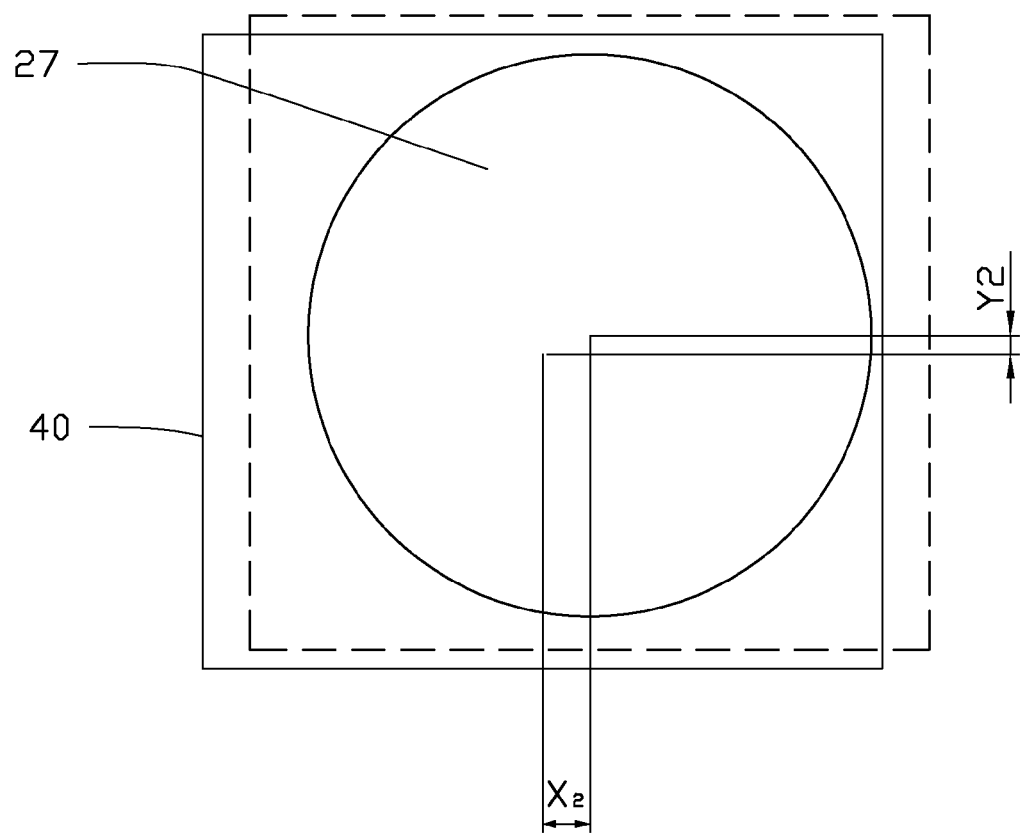
FIG. 6 is similar to FIG. 4, but showing correction of the displacement of the image sensor.
Figure 7:
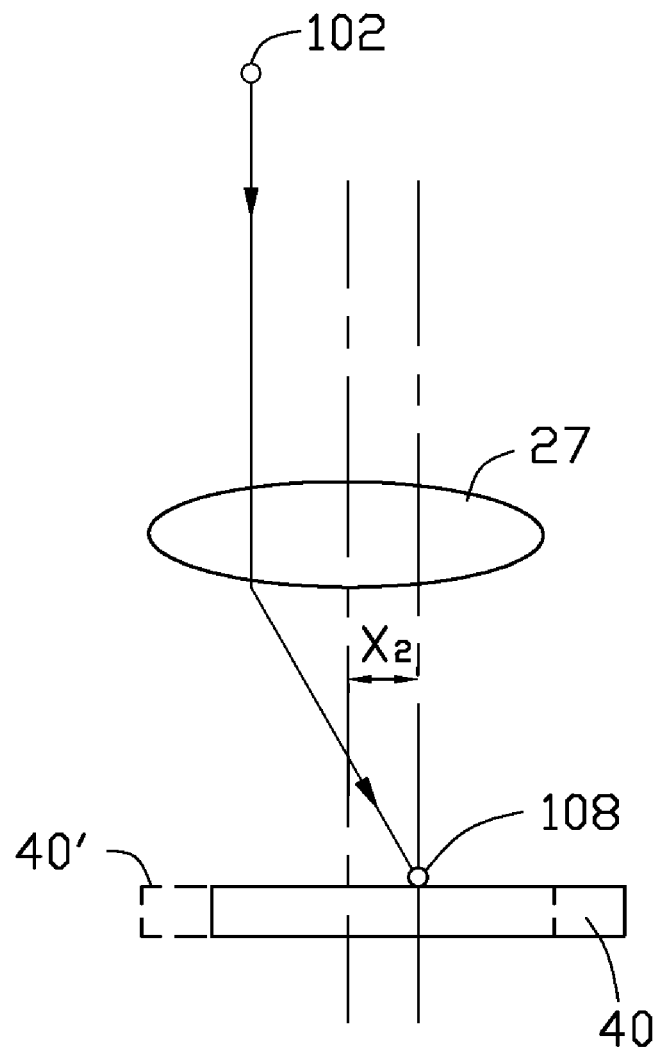
FIG. 7 is a side plan view corresponding to FIG. 6, which illustrates correction of the deviated light path of FIG. 6.

Referring to FIGS. 6 and 7, in yet another example, corrections to the displacement of the image sensor 40 are made. The lens 27 is moved back a distance X2 along the negative direction of the X-axis, and back a distance Y2 along the positive direction of the Y-axis, as shown in FIG. 6. Thus, the optical light path of the exemplary light beam from the object 102 is compensated. Accordingly, the exemplary light beam from the object 102 falls on the central region of the image sensor 40, and forms an image 108, as shown in FIG. 7. The position of the image 108 is similar to, or substantially the same as the position of the image 104. Thus, the exemplary light beam of the object 106 is still correctly and clearly projectable onto the central region of the image sensor 40 in spite of the shaking, hence successful anti-shake execution.

It is understood that the above-described embodiment are intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A camera module for capturing an image of an object, the camera module comprising:

a fixture comprising a top board and a pedestal extending downwardly from a peripheral portion of the top board, the pedestal comprising four interior periphery sidewalls connected one by one;

a lens module comprising a lens, the lens module secured on the fixture;

a movable frame;

a plurality of holding wires connected between the frame and the fixture;

an image sensor attached to the frame and spaced a distance from the lens module;

a position sensor configured for detecting displacement of at least one of the lens module and the image sensor caused by shake;

a plurality of magnets mounted on the frame, the plurality of magnets comprising a first magnet and a second magnet; and a plurality of magnetic field generators mounted on the fixture spatially corresponding to the respective magnets, the plurality of magnetic field generators comprising a first magnetic field generator corresponding to the first magnet and a second magnetic field generator corresponding to the second magnet, the first and second magnetic field generators being mounted on adjacent periphery sidewalls of the pedestal, respectively, each magnetic field generator configured for applying a magnetic field to the corresponding magnet, each of the magnetic field generators being electrifiable in response to displacement of at least one of the lens module and the image sensor, such that at least one of the magnets and the corresponding magnetic field generator cooperatively drive the lens module to move and compensate the displacement of the image sensor.

2. The camera module of claim 1, wherein the first magnetic field generator is arranged adjacent to the corresponding first magnet and configured for providing a first magnetic field around the first magnet, the second magnetic field generator is arranged adjacent to the second magnet and configured for providing a second magnetic field around the second magnet, and when the first magnetic field generator is electrified, the first magnet is driven in the first magnetic field and moves the frame and the image sensor in either of two opposite first component directions, and when the second magnetic field generator is electrified, the second magnet is driven in the second magnetic field and moves the frame and the image sensor in either of two opposite second component directions.

3. The camera module of claim 2, wherein the first component directions are substantially perpendicular to the second component directions, and the first and second component directions are located on a common plane substantially perpendicular to an optical axis of the lens module.

4. The camera module of claim 2, wherein the fixture comprises a hole defined in a central portion of the top board, the top board and the pedestal cooperate to define a first receiving space receiving the magnets and the magnetic field generators, and the hole is configured for allowing the transmission of the light to the image sensor through the lens module.

5. The camera module of claim 4, wherein a cross-section of the pedestal is substantially rectangular.

6. The camera module of claim 4, wherein the lens module further includes a barrel received in the first receiving space and attached to the top board, and the lens is received in the barrel.

7. The camera module of claim 4, wherein the frame comprises a base board and a holder extending upwardly from a peripheral portion of the base board toward the top board of the fixture, the base board and the holder cooperate to define a second receiving space receiving the image sensor, the holding wires are fixed between the holder and the top board of the fixture.

8. The camera module of claim 7, wherein the frame is made of metallic material for blocking the magnetic field generators and the magnets from causing electromagnetic interference to the image sensor.

9. The camera module of claim 7, further comprising a circuit board attached to the base board at a side thereof farther away from the holder, and the base board has a hole defined therein to expose the circuit board, the image sensor being mounted on the circuit board and extending through the hole to the second receiving space.

10. The camera module of claim 7, wherein a cross-section of the holder is substantially rectangular, and the holder includes four exterior periphery sides, and the first and second magnets are mounted on adjacent periphery sides of the holder, respectively.

11. The camera module of claim 10, wherein the plurality of holding wires includes four holding wires, and the four holding wires are fixed between the top board and the holder and located adjacent to respective exterior periphery sides.

12. The camera module of claim 1, wherein each of the holding wires is resilient, and each of the holding wires is substantially parallel to an optical axis of the lens module when none of the magnetic field generators is electrified.

13. The camera module of claim 1, further comprising a controller electrically connected to the position sensor and the magnetic field generators, the controller being configured for adjusting at least one of a magnitude, a direction, and a period of time of applying an electric current to at least one of the magnetic field generators, based on the displacement of at least one of the lens module and the image sensor.

14. The camera module of claim 1, wherein the position sensor is mounted on the fixture.

15. The camera module of claim 1, wherein each of the magnets comprises a permanent magnet or an electromagnet.

16. The camera module of claim 1, wherein each of the magnetic field generators comprises an electromagnetic coil.

17. A camera module for capturing an image of an object, the camera module comprising:
a fixture comprising a top board and a pedestal extending downwardly from a peripheral portion of the top board, the pedestal comprising four interior periphery sidewalls connected one by one;
a lens module comprising a lens, the lens module secured on the fixture;
a movable frame;
a plurality of holding wires fixed to the frame and the fixture;
an image sensor attached to the frame and held a space relative to the lens module;
a position sensor mounted on the fixture and configured for detecting displacement of at least one of the lens module and the image sensor caused by shake;
a first magnet and a second magnet mounted on the frame; and
a first magnetic field generator and a second magnetic field generator mounted on adjacent periphery sidewalls of the pedestal of the fixture, respectively, the first and second magnetic field generators located adjacent to the respective first and second magnets, the first magnet being movable in the magnetic field of the first magnetic field generator along either of two opposite first component directions under a condition that electric current is applied to the first magnetic field generator, and the second magnet being movable in the magnetic field of the second magnetic field generator along either of two opposite second component directions under a condition that electric current is applied to the second magnetic field generator, thereby compensating the displacement of at least one of the lens module and the image sensor;
a controller electrically connected to the position sensor and the first and second magnetic field generators, the controller being configured for applying electric current to the first and second magnetic field generators based on the displacement of at least one of the lens module and the image sensor.

18. The camera module of claim 17, wherein the first component directions are substantially perpendicular to the second component directions, and the first and second component directions are all located on a common plane substantially perpendicular to an optical axis of the lens module.

19. The camera module of claim 17, wherein each of the holding wires is stiff and resilient, and each of the holding wires is substantially parallel to an optical axis of the lens module when none of the magnetic field generators is electrified.

* * * * *